United States Patent [19]
Jackson et al.

[11] 3,981,061
[45] Sept. 21, 1976

[54] METHOD FOR JOINING PIPES

[75] Inventors: William M. Jackson, Allentown; Edwin E. Peters, Schnecksville, both of Pa.

[73] Assignee: Gulf & Western Manufacturing Company, Southfield, Mich.

[22] Filed: Sept. 26, 1974

[21] Appl. No.: 509,460

[52] U.S. Cl. ............................. 29/157 T; 29/464; 285/39; 285/197; 285/209; 285/DIG. 16
[51] Int. Cl.² ........................................ F16L 41/00
[58] Field of Search .......... 285/210, 209, 208, 197, 285/21, 22, 39, DIG. 16; 29/464, 271, 157 T, 157.1 R

[56] References Cited
UNITED STATES PATENTS

| | | | |
|---|---|---|---|
| 398,838 | 3/1889 | Machin | 285/209 |
| 1,049,283 | 12/1912 | Westphal | 285/209 |
| 1,355,450 | 10/1920 | Carlson | 285/209 |
| 2,293,399 | 8/1942 | Moecker et al. | 29/464 X |
| 3,716,257 | 2/1973 | Hackman et al. | 285/210 |
| 3,812,910 | 5/1974 | Wellstein | 285/209 X |

FOREIGN PATENTS OR APPLICATIONS

| | | | |
|---|---|---|---|
| 955,019 | 6/1949 | France | 285/209 |
| 1,410,386 | 8/1965 | France | 285/209 |
| 101,689 | 10/1916 | United Kingdom | 285/209 |

*Primary Examiner*—Thomas F. Callaghan
*Attorney, Agent, or Firm*—Meyer, Tilberry & Body

[57] ABSTRACT

A pipe joining device for interconnecting a main pipe to a branch pipe in fluid flow communication comprises a lug pipe, sealing collar and lock nut. The lug pipe is a short, externally threaded pipe having a pair of lugs extending radially from one end thereof. Arches cut in the central portion of the lug pipe extend the undercut stem portion in line with the lugs. A tilting and rocking motion inserts first one lug and then the other into a hole cut in the main pipe, clearance for the tilting movement being provided by the undercut stem and arches. The contoured sealing collar and lock nut are attached to the lug pipe to fasten the device to the main pipe. The branch pipe is externally threaded so it can be threaded into the internal threads of the lug pipe to complete the connection. A caulking, bonding or adhesive agent may be employed to provide a more fluid tight seal of the component parts.

1 Claim, 19 Drawing Figures

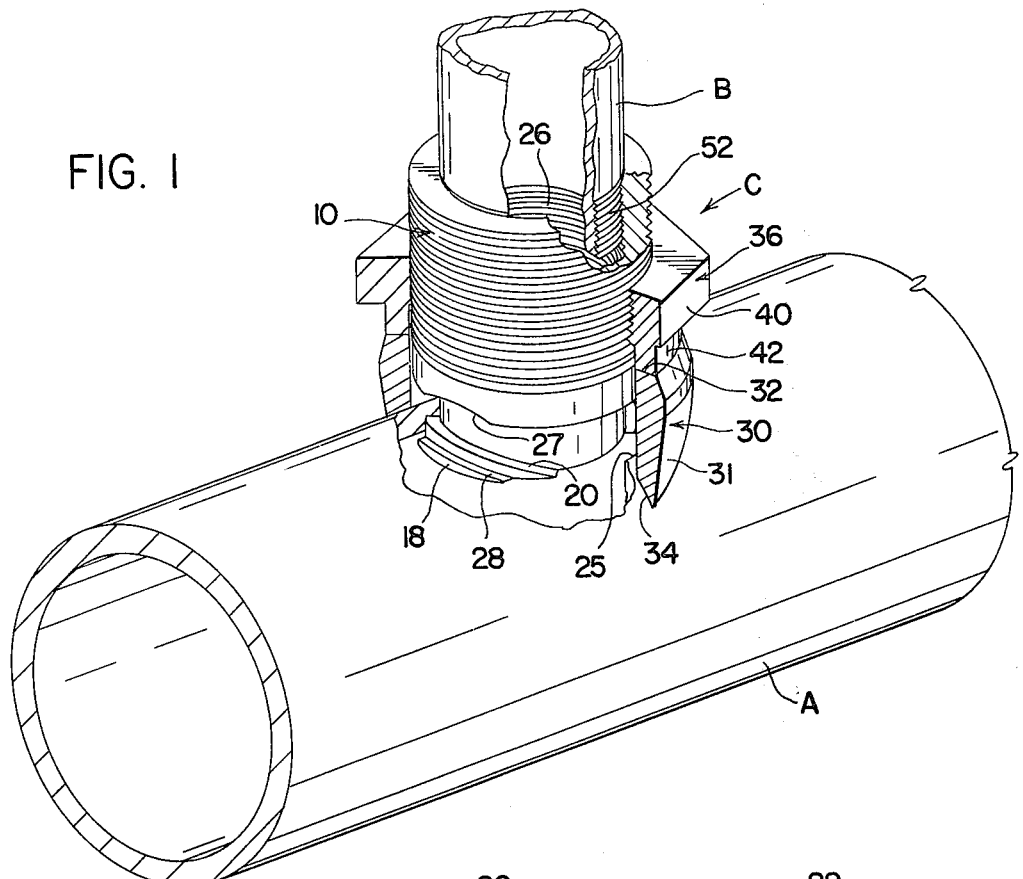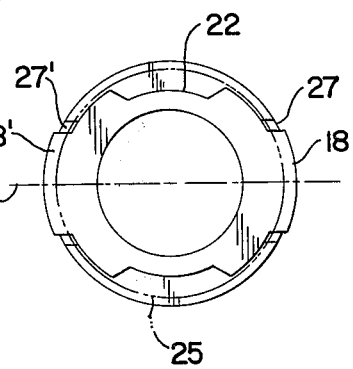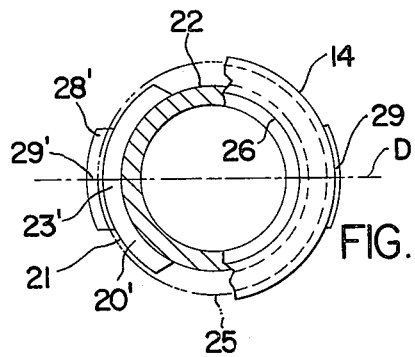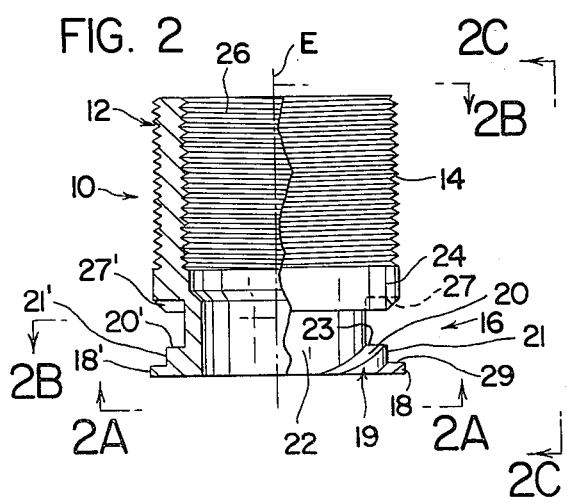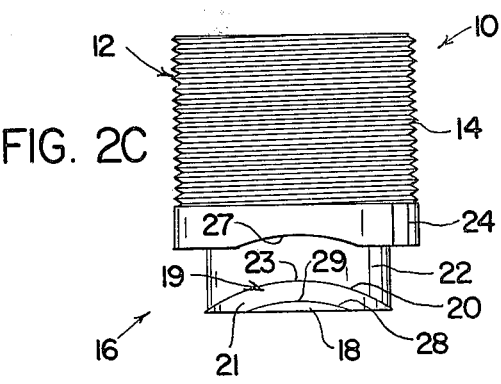

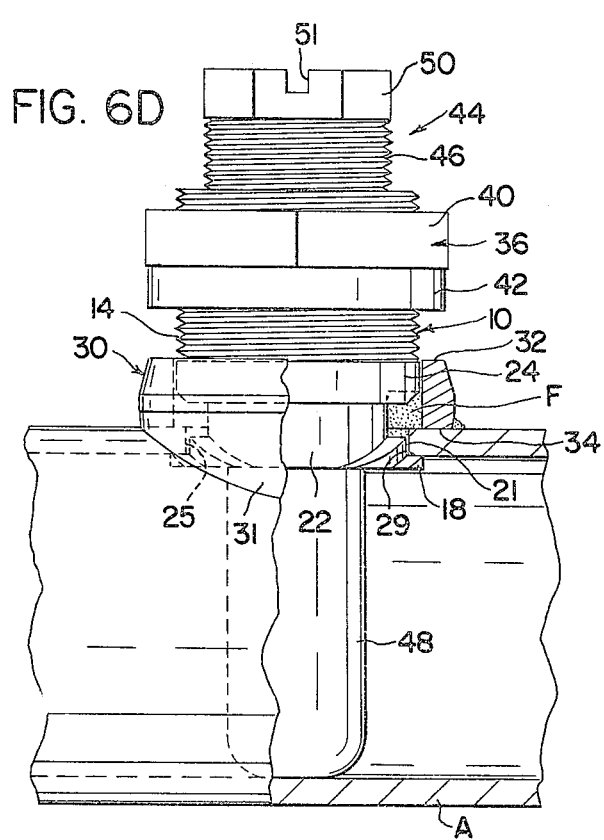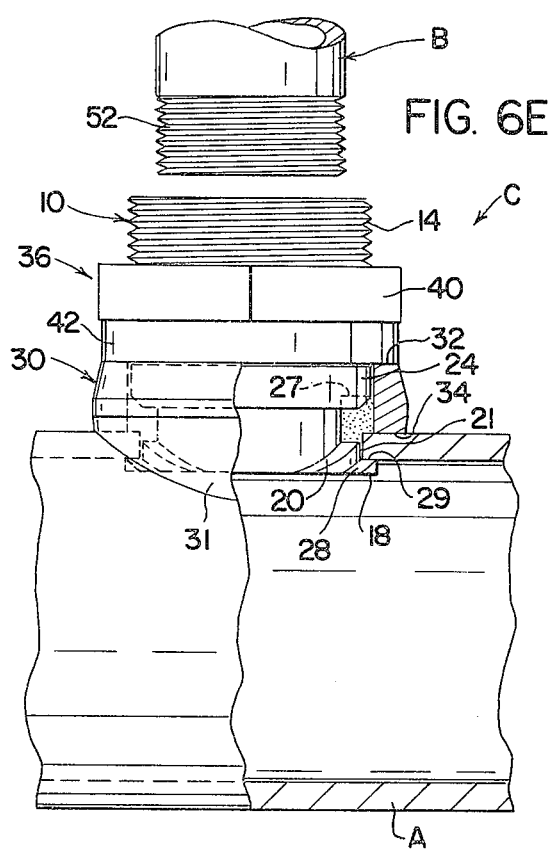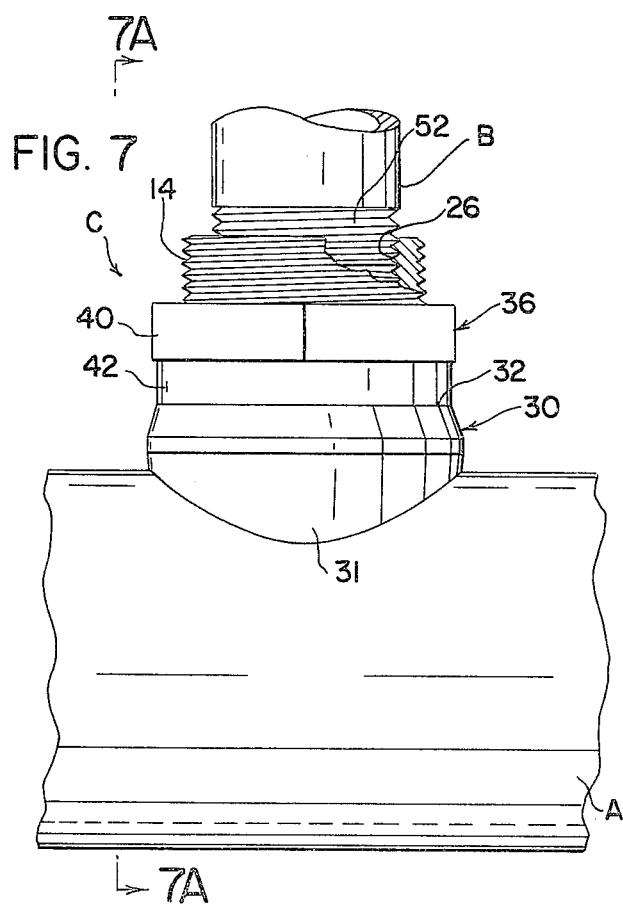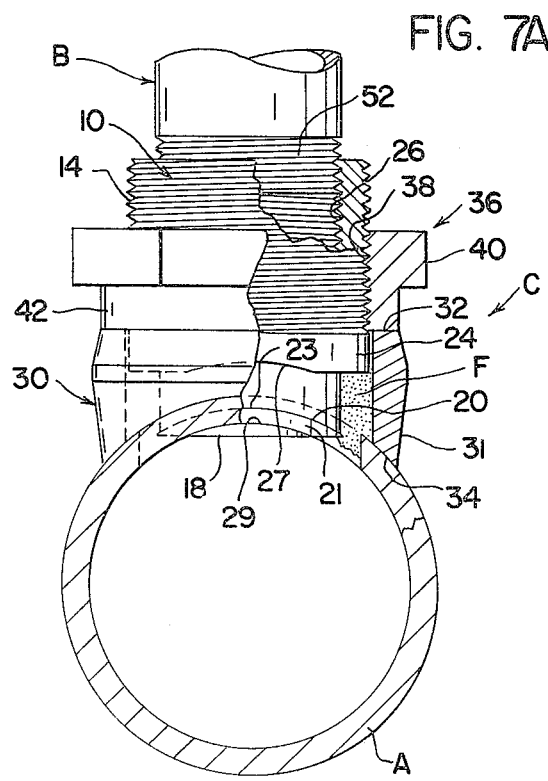

METHOD FOR JOINING PIPES

The present invention is concerned with the art of pipe couplings and is more particularly concerned with a device and method for interconnecting at an intermediate location on a first, main pipe a second, branch pipe to form a T or Y interconnection.

The invention is particularly applicable to tapping a branch pipe into a pre-existing first or main pipe and will be particularly described with reference thereto, although it will be appreciated that the invention has broader application and is generally utilizable whenever a branch connection of one pipe into a second pipe is to be made.

There are numerous prior art devices known for effectuating the coupling of a branch pipe to an intermediate portion of a main pipe. Generally, a hole is formed in the main pipe to receive a coupling section, which section comprises a short section of threaded pipe whose diameter is substantially the same as the diameter of the hole. The coupling section effectuates the interconnection between the main pipe and the branch pipe, and may have a lug extending therefrom. The lug is inserted into the hole with the coupling section held to an angle to the pipe offset somewhat from the desired connecting angle. A second, separate lug is then inserted into the hole and the coupling section is tipped into the desired connection angle and fastened to the second lug by suitable means such as a screw or bolt.

In other prior art embodiments, two lugs are provided separate from the coupling section. The lugs are inserted into a hole prepared in the first pipe and the coupling section is fastened to the projecting lugs. This coupling section thus mounted by lugs in the hole formed in the first pipe, is utilized to couple the branch or second pipe to the first pipe. It is of course known to use caulking means between the joined surfaces to effectuate a fluid tight seal.

Typical prior art patents showing the use of separate lugs or keys are U.S. Pat. No. 524,051, W. J. Walker, issued Aug. 7, 1894, and U.S. Pat. No. 606,536, J. H. Glauber, issued June 28, 1898.

Other prior art expedients are known, all of which may be essentially characterized as requiring the insertion of one or more lug devices, which are separate from the coupling section, into engagement with a hole formed in a pipe to which the connection is to be made. While holding the lugs in place with a portion thereof extending outwardly from the hole, a coupling section is affixed to the lugs.

A serious shortcoming of this prior art is the difficulty involved in properly placing and holding the separate lug means into position relative to the hole while joining the coupling section and the remainder of the connection device thereto. The separate lug means is usually relatively small, and may readily be dropped and lost within or without the pipe. This is a particularly acute problem where the main pipe is positioned vertically or otherwise at an angle to the horizontal. Another difficulty is that separate lug-type connectors sometimes utilize split tube type coupling sections which provide a seam through which leakage may occur.

Other prior art expedients have provided one place or integral lug pipe connecting means which, however, require that one or more slots or keyways be drilled at the periphery of the hole in the main pipe in order to receive the retaining lug, the connecting means thereafter being rotated to move the retaining lug out of alignment with the entry slot. Aside from the obvious disadvantage of requiring additional cutting and grinding of the hole, the slots or keyways leave openings which must be caulked or otherwise sealed in order to provide a fluid tight seal.

It is accordingly an object of the present invention to provide a device and a method of using the same which permits branch connections to be made to an existing main pipe without the use of separate lug pieces, and while utilizing a simple construction consisting of major pieces without small separate, keys or other lug type fittings capable of being dropped or lost.

Another object of the invention is to provide an integral lug pipe coupling device which permits insertion of the integral lugs into a round or regular hole without the need for providing slots or keyways at the periphery of the hole to accommodate the lugs or equivalent gripping means.

In accordance with the present invention there is provided a pipe joining device which includes a lug pipe having a lug end from which lugs extend, and an undercut stem portion between the lug end and a coupling section, a contoured sealing collar receivable over the lug pipe, and locking means engageable with the lug pipe and with the sealing collar.

In accordance with yet another aspect of the invention, a centering collar is located on the lug pipe between the undercut stem and the coupling section of the lug pipe to properly locate the sealing collar relative to the lug pipe. The centering collar (or the corresponding portion of the lug pipe is an embodiment without a centering collar) may have arches cut therein, which arches provide clearance for sidewise tilting of the lug pipe for insertion of it into a round hole cut, without keyways or slots, into a main pipe which is to be connected by the device of the invention to a branch pipe. The cut-away arches are, in effect, an extension of the undercut stem portion in the areas in line with the extended lugs.

In accordance with one aspect of the present invention, the lugs are integral with the lug pipe, i.e., the lugs are permanently affixed thereto, and preferably are formed as an integral part thereof, as by suitably machining the base end of the lug pipe. Preferably, the lug pipe has two lugs, positioned opposite each other along the circular periphery of one end of the lug pipe.

In accordance with another aspect of the invention, the integral lug has a locating ledge formed thereon to locate the lug pipe relative to the hole formed in the main pipe which is to be connected to a branch pipe by the device of the invention.

In accordance with yet another aspect of the invention, a locating tool is adapted to temporarily (during assembly) engage and center the lug pipe relative to the hole formed in the main pipe.

In accordance with another aspect of the invention, insertion of the lugs into the hole cut into the main pipe is accomplished by inserting one lug into the hole by tilting the lug pipe and placing the undercut stem portion against the edge of the hole, at the point facing the direction towards which the lug pipe coupling section is tilted, and then rocking the lug pipe in the opposite direction so that the second lug enters the hole.

In general, a pipe joining device in accordance with the invention for interconnecting in fluid flow communication a first, main pipe to a second, branch pipe includes a short lug pipe which has a coupling section with threads along at least a portion thereof. At one end of the lug pipe a pair of opposed lugs extend generally radially outwardly therefrom. The two lugs have top seating surfaces and are located respectively at opposite ends of a cross-sectional diameter of the lug pipe. The lugs may be stepped to provide locating ledges thereon to center the lug pipe in a hole cut in the wall of the main pipe, with the top seating surfaces of the lugs bearing on the interior wall of the main pipe at diametrically opposed points along the circumference of the hole cut therein.

The diameter across the lug pipe from lug edge to lug edge is greater than the diameter of the hole cut in the main pipe so that with both lugs inserted into the hole, the lugs bear on the interior wall of the main pipe adjacent the edge of the hole.

In order to permit placing both lugs within the hole without cutting a slot or keyway at one edge of the hole, the lug pipe has an undercut stem portion of lesser diameter than the coupling section, the stem portion being between the coupling section and the lugs; also clearance arches are cut from an intermediate portion of the lug pipe, in line with the lugs. The arches, in effect, extend the undercut stem portion in the vicinity of the lugs. A locating collar may be formed between the coupling section and the lugs, and the arches may be cut therefrom.

The device of the invention also includes a sealing collar receivable over the lug pipe, which collar has a contoured seating surface which is congruent to that portion of the exterior surface of the main pipe with which it is to come into contact. Since pipes are normally cylindrical in shape, the contoured seating surface is preferably formed to be congruent with the surface of a cylinder.

A threaded lock nut or equivalent locking means forms part of the device. When threaded locking means e.g., a lock nut is used, the nut is threadably receivable over the lug pipe coupling section which has exterior threads for the purpose. Advancing the locking means on the lug pipe draws the seating surfaces of the lugs towards the locking means in compressive bearing relationship therewith. This causes the seating surfaces of the lugs to bear against the interior surface of the main pipe and to compress the seating surface of the holding collar against the exterior surface of the main pipe whereby the assembly is tightened. The coupling section of the lug pipe extends beyond the tightened lock nut. The second, branch pipe has external threads at one end and these are threadably engaged with the internal threads on the extended portion of the coupling section and tightened thereon to complete the interconnection.

A method of effecting interconnection of the main and branch pipes utilizing the coupling device of the invention, includes cutting a hole in the surface of the main pipe, inserting one lug of the lug pipe therein and tilting the lug pipe with a "heel and toe" motion so that the second lug passes within the hole formed in the main pipe notwithstanding the fact that the distance across the lug pipe from the edge of one lug to the edge of the other lug is greater than the diameter of the hole. The undercut stem portion and the cut away arches provide clearance for a sufficient degree of shifting and tilting motion to permit entry of both lugs within the hole.

A locating tool which has a threaded shaft may be utilized to temporarily hold the lug pipe in position within the hole formed in the main pipe while the holding collar and lock nut means are being assembled. The interior of the lug pipe may also be threaded in order that the lug pipe may be engaged with the threaded locating tool. The lug pipe internal threads are preferably also utilized (after removal of the tool) to engage an externally threaded branch pipe. Alternately, an internally threaded branch pipe may be engaged with the lug pipe external threads.

Generally the hole cut in the main pipe is a circular hole, the plane of which is usually curved since the pipe wall in which the hole is cut is usually the wall of a cylinder. Obviously, the invention works equally well with any cross section of main pipe, be it circular, oval, rectangular or any other shape. If the coupling device of the invention is to be applied to a main pipe having a substantially flat surface, the contoured surface sealing collar may be dispensed with. The contoured sealing collar readily permits utilization of a rotatable locking means such as a threaded nut, while providing a tight seal over the surface of a cylindrical pipe.

Reference in the claims to a "smooth" hole cut into the pipe means a hole of regular (usually circular) shape without keyways or slots cut into its edge.

The invention may be better understood with reference to the following detailed description of a specific embodiment thereof, which is intended to illustrate and not limit the invention, and to the accompanying drawings wherein:

FIG. 1 is a perspective view with parts broken away showing a main pipe connected to a branch pipe by an embodiment of the coupling device in accordance with the invention;

FIG. 2 is a side view in elevation with parts broken away of an embodiment of the lug pipe component of the coupling device of the invention;

FIG. 2A is a bottom plan view taken along line 2A—2A of FIG. 2;

FIG. 2B is a section view taken along line 2B—2B of FIG. 2;

FIG. 2C is a side view in elevation taken along line 2C—2C of FIG. 2;

FIG. 6D is a partial section view in elevation showing engagement of the holding collar and lock nut components with the lug pipe and represents a stage of assembly subsequent to that illustrated in FIG. 6C;

FIG. 7 is a side view in elevation with parts broken away showing the completed assembly; and, FIG. 7A is an end view in elevation with parts broken away taken along line 7A—7A of FIG. 7.

Figure 3:
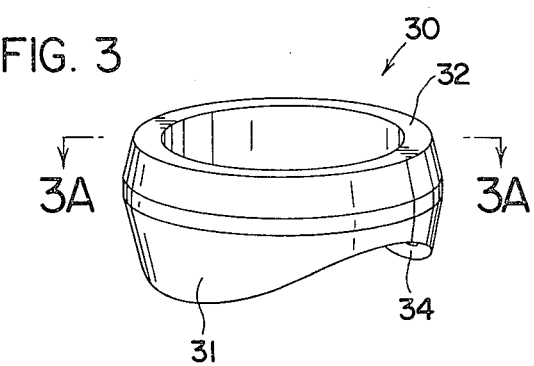
FIG. 3 is a perspective view of an embodiment of the sealing collar component of the coupling device of the invention.
Figure 3A:
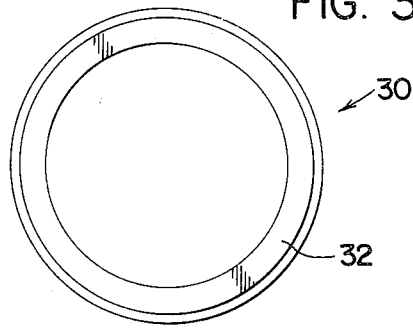
FIG. 3A is a section view taken along line 3A—3A of FIG. 3.

Referring now to FIG. 1, a first, main pipe A having a smooth hole 25 formed therein is shown interconnected to a second, branch pipe B by means of a pipe joining device C in accordance with the present invention. The component parts of pipe joining device C include a lug pipe 10, a sealing collar 30 and a lock nut 36.

Referring now to FIG. 2, lug pipe 10 has a coupling section 12 generally defined by external threads 14 extending along the length thereof, and a lug end 16 characterized by integral lugs 18, 18' extending radially outwardly therefrom. As best seen in FIG. 2A, lugs 18, 18' are positioned generally opposite each other, centered on opposite ends of the circumferential diameter (indicated by line D) of lug pipe 10. The relative location of hole 25 to lug pipe 10 after assembly is shown in phantom outline in FIGS. 2A and 2B, to assist in explaining assemby of the device as set forth hereinbelow.

An undercut stem portion 22 extends from lug end 16 to a centering collar 24. Centering collar 24 has arches 27, 27' (FIGS. 2 and 2C) cut therefrom generally above lugs 18, 18'.

The inside of hollow lug pipe 10 has an internal thread 26 formed thereon which extends generally coextensively with external threads 14.

Lugs 18, 18' are substantially identical to each other, each having a locating ledge 19, 19' formed as part thereof. Locating ledges 19, 19' are cut so as to provide locating surfaces 21, 21' which are substantially parallel to the longitudinal axis (indicated by line E in FIG. 2) of lug pipe 10.

As best seen with reference to FIGS. 2 and 2A, the top surfaces 20, 20' of locating ledges 19, 19' each slope downwardly from a central high point (23, 23' in FIGS. 2C and 2B, respectively) and terminate at the edge of lug end 16.

Similarly, lugs 18, 18' have top seating surfaces 28, 28' which slope downwardly from a central high point (29, 29' in FIGS. 2C and 2B, respectively) and terminate at the edge of lug end 16.

Referring to FIG. 3, holding collar 30 is a generally hollow ring having a tapered sidewall 31, a top bearing surface 32, and a generally saddle-shaped pipe seating surface 34. Pipe seating surface 34 has a generally U-shaped profile and is shaped to fit congruently to the outer surface of main pipe A.

Figure 4:
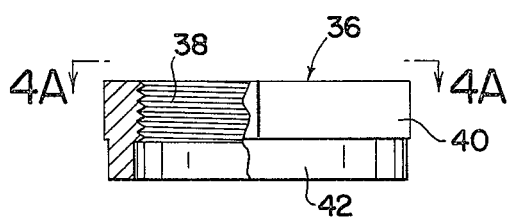
FIG. 4 is a side view in elevation with part broken away of an embodiment of the locking means component of the coupling device of the invention.
Figure 4A:
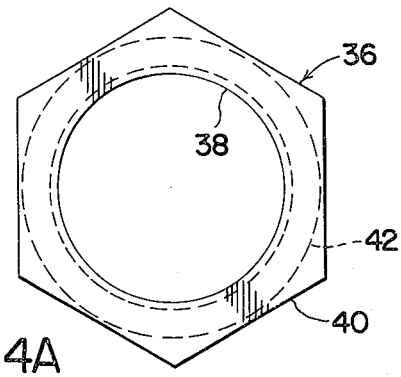
FIG. 4A is a section view taken along line 4A—4A of FIG. 4.

Referring now to FIGS. 4 and 4A, lock nut 36 has an interior thread 38 formed thereon inside a conventional hexagonal head 40. A ring shaped bearing collar 42 extends downwardly from hex head 40.

Figure 5:
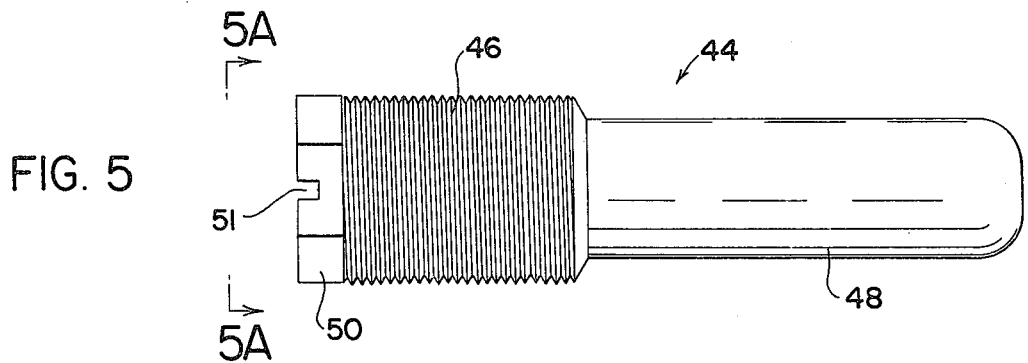
FIG. 5 is a side view of an embodiment of the locator tool of the invention.
Figure 5A:
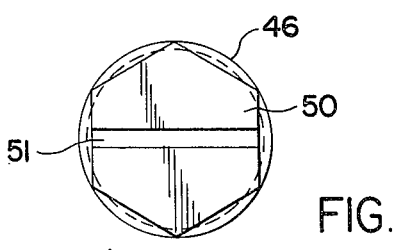
FIG. 5A is an end view taken along line 5A—5A of FIG. 5.

The assembly of the above-described components of coupling device C to interconnect a main pipe A to a branch pipe B as described hereinbelow may be facilitated by the utilization of a locator tool 44 as illustrated in FIGS. 5 and 5A. Locator tool 44 has an elongated body with an external thread 46 extending along a substantial portion thereof.

A blunt, probe end 48 is formed at one end of locator tool 44 and a turning head 50 is formed at the other end thereof. A groove 51 is formed in turning head 50 to facilitate turning thereof. Alternately or in addition, turning head 50 may have a conventional hex head to facilitate the turning thereof.

Figure 6:
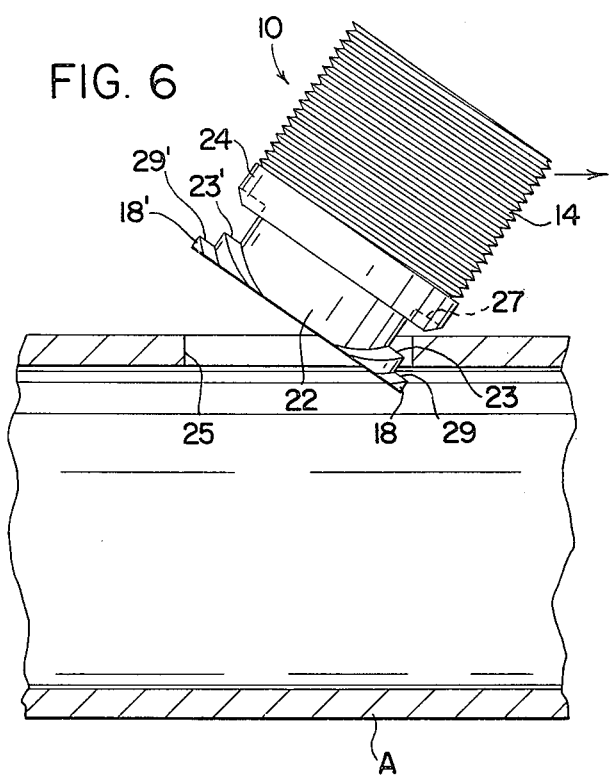
FIGS. 6, 6A and 6B are section views in elevation showing the sequence of insertion of the lug pipe component of FIG. 2 into a hole formed in a main pipe.

In order to effect the connection of a branch pipe to a main pipe using the coupling device of the invention, a smooth hole 25 of required size is cut into main pipe A, as may best be seen in FIG. 6. It will be noted that hole 25 is a generally round hole without slots or keyways cut into the periphery thereof. The diameter of hole 25 is such that locating surfaces 21, 21' of locating ledges 19, 19' will fit closely therein. (FIG. 2A) The diameter of hole 25 is less than the distance along line D (FIG. 2B) between the outermost edges of lugs 18, 18', by approximately the total depth of top surfaces 28, 28' measured at central high points 29, 29'.

Hole 25 may be sanded or ground to remove burrs and to roughen the area of the pipe about the periphery thereof. A cleaning solvent may also be employed to clean the area around the periphery of hole 25 in order to enhance utilization of a bonding agent as described hereinbelow. Similarly, the other portions of the coupling device which come into contact with main pipe A or main pipe B or with each other may be similarly roughened and cleaned in order to enhance the adhesion of bonding agent thereto.

Figure 6A:
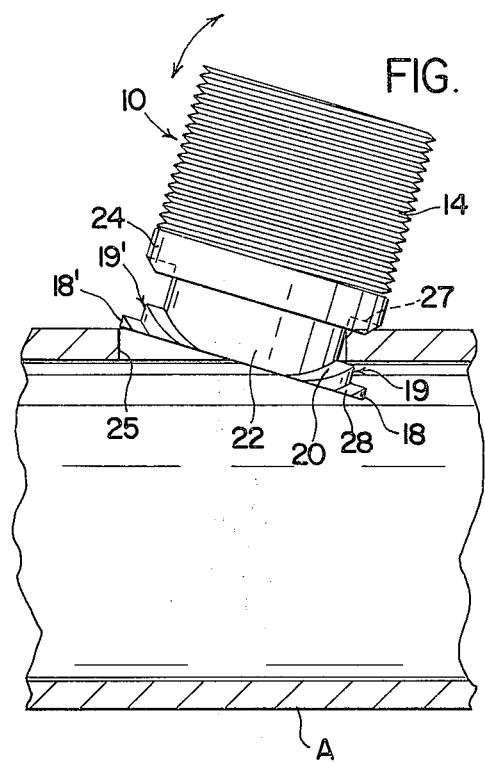
Figure 6B:
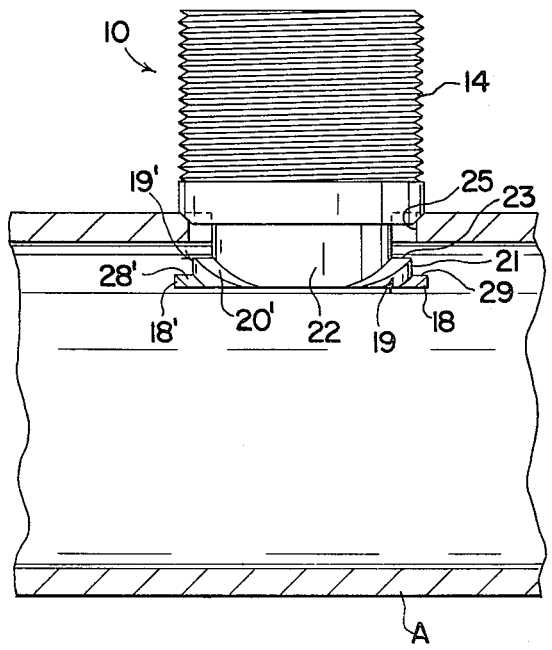

Referring now to FIG. 6, lug pipe 10 has been tilted and one lug 18 thereof inserted into hole 25. Lug pipe 10 is shifted to one side in the direction towards which the top (coupling section) of lug pipe 10 is tilted, as shown by the arrow in FIG. 6. Undercut stem 22 provides sufficient leeway to shift lug pipe 10 until the edge of hole 25 is immediately adjacent undercut stem portion 22 or in contact therewith. Cut-away arch portion 27 provides the necessary clearance between centering collar 24 and pipe A to permit tilting lug pipe 10 to the extent shown. Utilizing a "heel and toe" motion as indicated by the curved double arrow in FIG. 6A, lug pipe 10 is rocked in the direction (opposite the direction of tilt) to place lug 18' within hole 25, the edge of lug 18' just clearing the edge of hole 25. As shown in FIG. 6B, lug pipe 10 is thus positioned with lugs 18, 18' and a portion of undercut stem 22 inserted within hole 25 in main pipe A, and centering collar 24 and coupling end 12 of lug pipe 10 protruding therefrom. The high points 23, 23' and 29, 29' of, respectively, top surfaces 20, 20' and 28, 28' are generally aligned along a line parallel to the longitudinal axis of main pipe A. The curved upper surfaces 20, 20' and 28, 28' accommodate, partially at least, the cross-sectional curvature of the interior wall of main pipe A and aid in providing a snug, stable fit. This may best be seen in FIG. 7A.

Figure 6C:
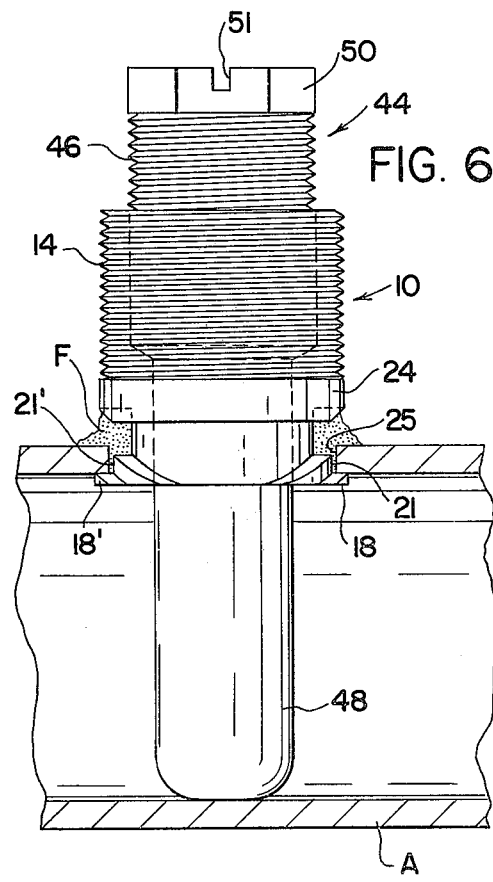
FIG. 6C is a section view in elevation showing engagement of the locator tool of FIG. 5 with the lug pipe and main pipe, and represents a stage of assembly subsequent to that illustrated in FIG. 6B.

Locator tool 44 is then inserted into lug pipe 10 and the threads 46 of locator tool 44 are engaged with internal threads 26 of lug pipe 10. Locator tool 44 is then rotated utilizing slot 51 and/or hex head 50 thereof until blunt probe end 48 engages the interior wall of main pipe A opposite hole 25, as shown in FIG. 6C. Continued rotation of locator tool 44 will then raise lug pipe 10 into position so that top seating surfaces 28, 28' of lugs 18, 18' engage the interior wall of main pipe A adjacent the edge of hole 25. Locating surfaces 21, 21' of locating ledges 19, 19' center lug pipe 10 with respect to hole 25, as may be seen in FIG. 6C. A bonding agent F may now be applied.

With locator tool 44 remaining in place, holding collar 30 is slipped thereover and over lup pipe 10 so that contoured pipe seating surface 34 fits over and snugly seats on the outer surface of main pipe A, as may be seen in FIGS. 6D, 7 and 7A. Centering collar 24 of lug pipe 10 centers holding collar 30 properly thereabout, the inner peripheral surface 35 of the upper portion of holding collar 30 being in face-to-face relationship with the outer periphery of holding collar 24.

With holding collar 30 in place, lock nut 36 is slipped over locator tool 44 and coupling section 12 of lug pipe 10 so that interior thread 38 of lock nut 36 engages exterior thread 14 of lug pipe 10 and lock nut 36 is rotated to threadably advance it along lug pipe 10. Rotation of lock nut 36 is continued until bearing collar 42 of lock nut 36 securely bears on top bearing surface 32 of holding collar 30. The length of coupling section 12 of lug pipe 10 is such that a portion of threads 26 sufficient to engage a branch pipe B as described below extends within section 12 when lock nut 36 is in its tightened position, as shown in FIG. 6E. With lock nut 36 tightened in place, lug pipe 10 is secured thereby with the top seating surfaces 28, 28' of lugs 18, 18' being firmly seated against the interior wall of main pipe A adjacent respective opposite portions of the edge of hole 25. Accordingly, locator tool 44 may now be removed by reversibly rotating it to withdraw the same.

With coupling device C thus attached to main pipe A, a second, branch pipe B having an exterior thread 52 formed thereon (FIG. 7) is threaded within the portion of coupling section 12 which contains threads 26 therein. Branch pipe B is rotated to threadably engage interior thread 26 of coupling section 12 with exterior thread 52. Rotation of branch pipe B is continued until the required depth of engagement of branch pipe B is attained.

As will be appreciated by those skilled in the art, the fluid tight engagement of the various parts is obtained by tightly threading lock nut 36 and branch pipe B to effectuate a tight seal. Fluid tightness may be enhanced by providing, as above mentioned, a bonding agent or adhesive to the various contact parts of the coupling device and pipes. For example, a bonding, caulking or adhesive agent seal may be formed between centering collar 24 and the periphery of hole 25, in the wall of pipe A. Similarly, the entire saddle surface 34 and corresponding portion of the exterior of pipe A may have a bonding, caulking or adhesive agent applied thereto prior to assembly. External threads 14 of coupling section 12 to lug pipe 10 and exterior threads 52 of branch pipe B may also have a suitable bonding, caulking or adhesive agent affixed thereto to enhance the fluid tightness of the connection.

While the invention has been described in detail with reference to a specific embodiment thereof it will be appreciated that upon a reading and understanding of the foregoing description various modifications and alterations thereto will occur to those skilled in the art, which modifications and alterations are nonetheless within the spirit and scope of the present invention.

For example, the coupling device shown provides a 90° connection between main pipe A and branch pipe B but it will be apparent that an angle connection could readily be provided by simply forming lug pipe 10 so that coupling section 12 thereof is disposed at an angle relative to undercut stem portion 22. For exampl, a 45° angle may be utilized to provide a Y-type connector.

It will be further appreciated that utilization of a locator tool, while convenient, is not absolutely essential, it being possible to temporarily hold lug pipe 10 in place by hand or by a clip or other device while the other component parts are being assembled.

It is intended to include all such modifications and alterations within the scope of the appended claims.

What is claimed is:

1. A method of attaching a coupling device comprising a lug pipe having a stem portion undercut about the entire periphery thereof, between a lug end and a coupling section so that the stem portion comprises a smaller diameter portion of said lug pipe, a pair of integral lugs extending respectively, from diametrically opposed points on the circumference of said lug end, locking means engageable with said lug pipe so that progressive engagement of said locking means with said lug pipe draws said lug toward said locking means into a compressive bearing relationship therewith, to interconnect a branch pipe in fluid flow communication with a main pipe in which a suitable circular hole has been formed, including the steps of inserting one lug of said lug pipe into said hole, rocking said lug pipe in the direction to insert the second lug into said hole, engaging a locator tool having a probe end with said lug pipe, progressively advancing said locator tool with respect to said lug pipe until said probe end contacts the interior surface of said main pipe opposite said hole and said lugs are in bearing contact with the interior surface of said main pipe adjacent said hole, engaging said locking means with said lug pipe and advancing said locking means into bearing contact relationship with said pipe whereby said lugs are maintained in bearing relationship with the interior surface of said main pipe, disengaging said locator tool from said lug pipe, and connecting said branch pipe to the coupling section of said lug pipe.

* * * * *